US010245786B2

(12) United States Patent
Thresh et al.

(10) Patent No.: US 10,245,786 B2
(45) Date of Patent: Apr. 2, 2019

(54) SYSTEM FOR PLANARIZING OBJECTS IN THREE-DIMENSIONAL OBJECT PRINTING SYSTEMS WITH REDUCED DEBRIS

(71) Applicant: Xerox Corporation, Norwalk, CT (US)

(72) Inventors: Donald Thresh, Fairport, NY (US); James D. VanBortel, Rochester, NY (US); Michael N. Soures, Webster, NY (US); Richard B. Gruszewski, Penfield, NY (US)

(73) Assignee: Xerox Corporation, Norwalk, CT (US)

( * ) Notice: Subject to any disclaimer, the term of this patent is extended or adjusted under 35 U.S.C. 154(b) by 827 days.

(21) Appl. No.: 14/573,160

(22) Filed: Dec. 17, 2014

(65) Prior Publication Data

US 2016/0176119 A1    Jun. 23, 2016

(51) Int. Cl.
*B29C 64/30* (2017.01)
*B33Y 10/00* (2015.01)
(Continued)

(52) U.S. Cl.
CPC ............ *B29C 64/30* (2017.08); *B29C 64/112* (2017.08); *B29C 64/218* (2017.08); *B29C 64/35* (2017.08);
(Continued)

(58) Field of Classification Search
CPC ..... B33Y 10/00; B33Y 30/00; B29C 67/0096; B29C 64/106; B29C 64/112; B29C 64/118; B29C 64/141; B29C 64/153; B29C 64/165; B29C 64/20; B29C 64/205; B29C 64/218; B29C 64/35; B29C 64/30; B29C 64/357; B29C 64/255; B29C 64/307; B29C 64/343; B29C 64/379
See application file for complete search history.

(56) References Cited

U.S. PATENT DOCUMENTS 3,570,341 A * 3/1971 Abbott, Jr. ................ B26F 1/00
                                                            100/210
4,675,825 A * 6/1987 DeMenthon ....... B23D 57/0046
                                                            219/69.12

(Continued)

FOREIGN PATENT DOCUMENTS

JP    WO 2012111382 A1 * 8/2012 ......... B29C 67/0081

*Primary Examiner* — Seyed Masoud Malekzadeh
*Assistant Examiner* — Taryn Trace Willett
(74) *Attorney, Agent, or Firm* — Maginot Moore & Beck LLP

(57) ABSTRACT

A three-dimensional object printing system improves the collection of waste materials during object printing. The printing system includes an ejector head configured to eject material, a platform configured to move in a process direction to a position opposite the ejector head to enable the ejector head to eject material onto the platform, and first and second planarizers configured to remove a first portion and a second portion, respectively, of the material ejected onto the platform. The printing system further includes a first housing defining a first chamber in which at least one of the first planarizer and the second planarizer is positioned, and a first vacuum source connected to the first housing, the first vacuum source being configured to produce a first vacuum in the first chamber to pull material removed by the at least one of the first planarizer and the second planarizer from the first chamber.

11 Claims, 6 Drawing Sheets

(51) Int. Cl.
*B33Y 30/00* (2015.01)
*B33Y 40/00* (2015.01)
*B29C 64/218* (2017.01)
*B29C 64/112* (2017.01)
*B29C 64/35* (2017.01)

(52) U.S. Cl.
CPC ............... *B33Y 10/00* (2014.12); *B33Y 30/00* (2014.12); *B33Y 40/00* (2014.12)

(56) References Cited

U.S. PATENT DOCUMENTS

| | | | | |
|---|---|---|---|---|
| 4,961,901 A * | 10/1990 | Wullenweber | B22F 3/1118 | 419/19 |
| 5,122,441 A * | 6/1992 | Lawton | B33Y 10/00 | 156/58 |
| 5,174,931 A * | 12/1992 | Almquist | B29C 41/12 | 118/100 |
| 5,260,009 A * | 11/1993 | Penn | B29C 67/0059 | 118/100 |
| 5,348,693 A * | 9/1994 | Taylor | H05K 3/4664 | 156/155 |
| 5,758,237 A * | 5/1998 | Abramsohn | G03G 15/11 | 15/1.51 |
| 5,902,537 A * | 5/1999 | Almquist | B29C 41/12 | 264/308 |
| 5,945,058 A * | 8/1999 | Manners | B29C 41/12 | 264/308 |
| 6,169,605 B1 * | 1/2001 | Penn | B29C 67/0059 | 358/1.1 |
| 6,174,156 B1 * | 1/2001 | Chapman | B29C 41/12 | 118/413 |
| 6,193,923 B1 * | 2/2001 | Leyden | B29C 41/12 | 264/308 |
| 6,241,934 B1 * | 6/2001 | Everett | B29C 67/0066 | 264/401 |
| 6,764,636 B1 * | 7/2004 | Allanic | B29C 41/12 | 118/100 |
| 8,911,226 B2 * | 12/2014 | Gunther | B29C 67/0081 | 264/308 |
| 9,126,367 B1 * | 9/2015 | Mark | B29C 67/0085 | |
| 9,440,285 B2 * | 9/2016 | Teulet | B22F 3/1055 | |
| 2001/0050448 A1 * | 12/2001 | Kubo | B29C 67/0077 | 264/308 |
| 2003/0020767 A1 * | 1/2003 | Saksa | B41J 3/407 | 347/2 |
| 2005/0023148 A1 * | 2/2005 | Lockard | C25D 5/022 | 205/136 |
| 2005/0104241 A1 * | 5/2005 | Kritchman | B33Y 30/00 | 264/40.1 |
| 2005/0202756 A1 * | 9/2005 | Moore | B24B 37/005 | 451/5 |
| 2006/0158456 A1 * | 7/2006 | Zinniel | B29C 67/0055 | 345/589 |
| 2010/0151136 A1 | 6/2010 | Davidson et al. | | |
| 2015/0110991 A1 * | 4/2015 | Miwa | C03B 33/076 | 428/77 |
| 2015/0343533 A1 * | 12/2015 | Park | B28B 7/465 | 425/78 |
| 2015/0367416 A1 * | 12/2015 | Buller | B23K 26/346 | 419/53 |
| 2016/0236422 A1 * | 8/2016 | Sakura | B29C 67/0077 | |
| 2016/0243619 A1 * | 8/2016 | Gothait | C09D 11/30 | |
| 2017/0297263 A1 * | 10/2017 | Ederer | C09D 7/69 | |

* cited by examiner

US 10,245,786 B2

SYSTEM FOR PLANARIZING OBJECTS IN THREE-DIMENSIONAL OBJECT PRINTING SYSTEMS WITH REDUCED DEBRIS

TECHNICAL FIELD

The system and method disclosed in this document relate to printers that produce three-dimensional objects and, more particularly, to planarizing mechanisms in such printers.

BACKGROUND

Digital three-dimensional manufacturing, also known as digital additive manufacturing, is a process of making a three-dimensional solid object of virtually any shape from a digital model. Three-dimensional printing is an additive process in which one or more printheads eject successive layers of material on a substrate in different shapes. Typically, ejector heads, which are similar to printheads in document printers, include an array of ejectors that are coupled to a supply of material. Ejectors within a single ejector head can be coupled to different sources of material or each ejector head can be coupled to different sources of material to enable all of the ejectors in an ejector head to eject drops of the same material. Materials that become part of the object being produced are called build materials, while materials that are used to provide structural support for object formation, but are later removed from the object are known as support materials. Three-dimensional printing is distinguishable from traditional object-forming techniques, which mostly rely on the removal of material from a work piece by a subtractive process, such as cutting or drilling.

A prior art three-dimensional object printing system 10 is shown in FIG. 7. In the view depicted in that figure, a platform 14, called a cart, includes wheels 18 (FIG. 6) that ride upon track rails 22 to enable the cart to move in a process direction P between printing stations, such as the printing station 26 shown in FIG. 7. Printing station 26 includes four ejector heads 30 as shown in the figure, although fewer or more ejector heads can be used in a printing station. Once the cart 14 reaches the printing station 26, the cart 14 transitions to enable bearings 34 to roll upon precision rails 38. Precision rails 38 are cylindrical rail sections that are manufactured within tight tolerances to help ensure accurate placement and maneuvering of the cart 14 beneath the ejector heads 30. Linear electrical motors are provided within housing 42 and are operatively connected to the wheels 18 of cart 14 to move the cart along the track rails 22 and to the bearings 34 to maneuver the cart 14 on the precision rails 38. Once the cart 14 is beneath the printing station 26, ejection of material occurs in synchronization with the motion of the cart. The electrical motors in housing 42 are also configured move the cart in an X-Y plane that is parallel to the ejector heads 30 as layers of material are formed in the object. Additional motors (not shown) move the printing station 26 vertically with respect to the cart 14 as layers of material accumulate to form an object. Alternatively, a mechanism can be provided to move the cart 14 vertically with respect to rails 38 as the object is formed on the top surface of the cart. Once the printing to be performed by a printing station is finished, the cart 14 is moved to another printing station for further part formation or for layer curing or other processing.

An end view of the prior art system 10 is shown in FIG. 6. That view depicts in more detail the wheels 18 on which the cart 14 rides the track rails 22. Bearings 34 of the cart 14 are positioned on the precision rails 38 in an arrangement that facilitates accurate positioning of the build platen on the cart 14. Specifically, bearings 34 are positioned at a right angle to one another on one of the rails 38 to remove 4 degrees of freedom of the cart 14, while the other bearing 34 rests on the other rail 38 to remove one more degree of freedom. A linear motor operates to move the cart 14 over an upper surface 50 of the housing 42. The motor has a stationary motor segment within the housing 42 and a magnet 46 mounted to the underside of the cart 14. Gravity and magnetic attraction between the stationary motor segment and the magnet 46 hold the bearings 34 in contact with the rails 38.

When carts are not present underneath the ejector heads 30, errant drips of materials can fall from the ejector heads and produce undesired debris and contamination on the precision rails 38 and the housing 42. Also, air-borne contaminants in the environment, such as dust or other particulate matter, can fall and collect on the rails 38 and the housing 42. When these contaminants and debris are located at any interface between the bearings 34 and the rails 38, the linear velocity of the cart is disrupted and the quality of the printed object is affected. Similarly, when these materials are within the gap between the top surface 50 of the housing 42 and the magnet 46, the magnetic attraction can be affected and enable the cart to be less constrained. Additionally, the collection of material drops on top of the housing 42 can also affect the dissipation of heat from the motor and cause motion quality disturbances, impacting the performance and reliability of the motor. In order to produce three-dimensional objects with acceptable quality, the motion of the cart 14 beneath the ejector heads 30 needs to be precise. Therefore, improvements in three-dimensional printing systems that help eliminate the contamination on the precision rails and motor housing that affects the accuracy of the placement and movement of the cart would be beneficial.

SUMMARY

A three-dimensional printing system incorporates an improved planarizer system improves the collection of materials removed during planarizing of the printed object. The three-dimensional object printing system includes an ejector head configured to eject material and a platform configured to move in a process direction to a position opposite the ejector head to enable the ejector head to eject material onto the platform. The printing system further includes a first planarizer positioned in the process direction to be opposite the platform after the ejector head has ejected material onto the platform. The first planarizer is separated from the platform at a first distance and is configured to remove a first portion of the material ejected onto the platform. A second planarizer is positioned in the process direction to be opposite the platform after the first planarizer has removed material. The second planarizer is separated from the platform at a second distance that is less than the first distance, and is configured to remove a second portion of the material ejected onto the platform. The system further includes a first housing defining a first chamber in which at least one of the first planarizer and the second planarizer is positioned and a first vacuum source connected to the first housing. The first vacuum source is configured to produce a first vacuum in the first chamber to pull material removed by the at least one of the first planarizer and the second planarizer from the first chamber.

A method of printing an object in a three-dimensional printing system improves collection of debris and material during planarizing of the object. The method includes ejecting material onto a platform positioned opposite the ejector head, moving the platform in a process direction to a first position opposite a first planarizer at a first distance from the platform, and removing a first portion of the material with the first planarizer. The method further includes moving the platform in the process direction to a second position opposite a second planarizer at a second distance from the platform, the second distance being less than the first distance, removing a second portion of the material with the second planarizer, and operating a first vacuum source to produce a first vacuum to pull material removed by at least one of the first planarizer and the second planarizer from a first chamber of a first housing, in which the at least one of the first planarizer and the second planarizer is positioned.

A system for planarizing an object in a three-dimensional printing system improves the collection of materials removed during planarizing of the printed object. The system includes a first planarizer, a second planarizer, a first housing, and a first vacuum source. The first planarizer is positioned at a first vertical position and is configured to remove a first portion of material from an object on a platform positioned opposite the first planarizer. The second planarizer is positioned in a process direction to be opposite the platform after the first planarizer has removed the first portion of the material. The second planarizer is positioned a second vertical position that is lower than the first vertical position, and is configured to remove a second portion of the material from the object on the platform. The first housing defines a first chamber in which at least one of the first planarizer and the second planarizer is positioned, and the first vacuum source is connected to the first housing. The first vacuum source is configured to produce a first vacuum in the first chamber to pull material removed by the at least one of the first planarizer and the second planarizer from the first chamber.

BRIEF DESCRIPTION OF THE DRAWINGS

The foregoing aspects and other features of a cart that helps eliminate the collection of materials from the ejectors heads and other debris are explained in the following description, taken in connection with the accompanying drawings.

DETAILED DESCRIPTION

Figure 1:
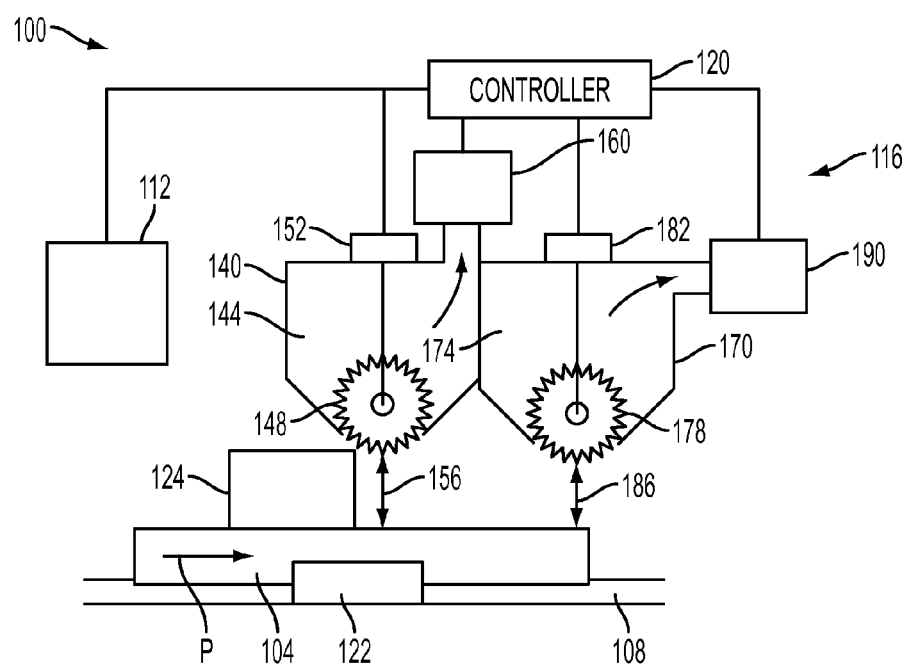
FIG. 1 is a side schematic view of a three-dimensional object printing system having two planarizers.

For a general understanding of the environment for the system and method disclosed herein as well as the details for the system and method, reference is made to the drawings. In the drawings, like reference numerals have been used throughout to designate like elements.

A three-dimensional object printing system 100 is illustrated schematically in FIG. 1. The printing system 100 includes a platform 104 supported for movement on rails 108, an ejector head 112, a planarizer system 116, and a controller 120. The platform 104 is configured to be moved by a linear motor 122 along the rails 108 in a process direction P from the ejector head 112 to the planarizer system 116. When the platform 104 is positioned opposite the ejector head 112, the ejector head 112 is configured to eject material onto the platform 104 to form an object 124.

The planarizer system 116 includes a first housing 140 defining a first chamber 144 in which a first planarizer 148 is positioned. A first actuator 152 is operatively connected to the first planarizer 148 and is configured to position the first planarizer 148 at a desired vertical position that is at a first vertical distance 156 from the platform 104. The first chamber 144 is fluidly connected to a first vacuum source 160, which is configured to produce a vacuum in the first chamber 144 to pull debris from the first chamber 144 that is produced by planarizing the object 124 with the planarizer 148.

The planarizer system 116 further includes a second housing 170 defining a second chamber 174 in which a second planarizer 178 is positioned. A second actuator 182 is operatively connected to the second planarizer 178 and is configured to position the second planarizer 178 at a desired vertical position so the second planarizer 178 is at a second vertical distance 186 from the platform 104. The second chamber 174 is fluidly connected to a second vacuum source 190 that is configured to produce a vacuum in the second chamber 174 to pull debris from the second chamber 174 that is produced by planarizing the object 124 with the planarizer 178.

As used herein, the term planarizer refers to a device configured to remove material from the object 124 on the platform 104 to form the upper surface of the object into a flat horizontal plane. In some embodiments, the planarizers are cylindrical rollers having a knurled or rough surface, a sharp cutting edge, or a polishing surface. The planarizer rollers are driven by actuator devices to rotate and move steadily through a horizontal plane so the rough surface of the planarizer produces a flat planar surface on the object 124. The second vertical distance 186, at which the second planarizer 178 is positioned relative to the platform 104, is less than the first vertical distance 156, at which the first planarizer 148 is positioned relative to the platform 104, such that the first planarizer 148 removes a first portion of the object 124 and the second planarizer 178 removes a second portion of the object 124 untouched by the first planarizer as the platform 104 and object 124 move in the process direction P. In some embodiments, one or both of the planarizers includes a blade or other cutting mechanism instead of a roller to planarize the surface of the object by cutting uneven portions from the surface. Additionally, the planarizer does not have to be limited to producing a flat planar surface. Instead, in some embodiments, the planarizer is configured to produce a non-flat or curved surface. In such embodiments, the planarizer motor may be configured to move the planarizer vertically or horizontally as the object moves beneath the planarizer to produce the curved or non-flat surface, or the planarizer may have a curved or discontinuous surface to produce the desired curved or non-flat surface.

Figure 2:
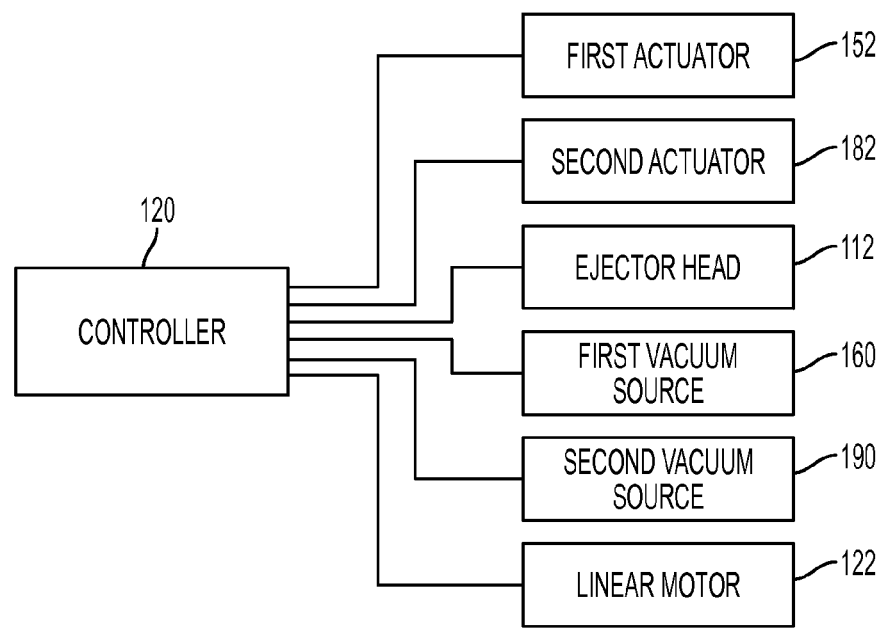
FIG. 2 is a schematic diagram of the controller of the three-dimensional object printing system of FIG. 1.

As is illustrated in FIG. 2, the controller 120 is operatively connected to the first and second actuators 152, 182, the ejector head 112, the first and second vacuum sources 160, 190, and the linear motor 122. Operation and control of the various components and functions of the printing system 100 are performed with the aid of the controller 120. The controller 120 is implemented with a general or specialized programmable processor that executes programmed instructions. In some embodiments, the controller includes more than one general or specialized programmable processor. The instructions and data required to perform the programmed functions are stored in a memory unit associated with the controller. The processor, memory, and interface circuitry configure the controller 120 to perform the functions and processes described below. These components can be provided on a printed circuit card or provided as a circuit in an application specific integrated circuit (ASIC). Each of the circuits can be implemented with a separate processor or multiple circuits can be implemented on the same processor. Alternatively, the circuits can be implemented with discrete components or circuits provided in VLSI circuits. Also, the circuits described herein can be implemented with a combination of processors, ASICs, discrete components, or VLSI circuits.

Figure 3:
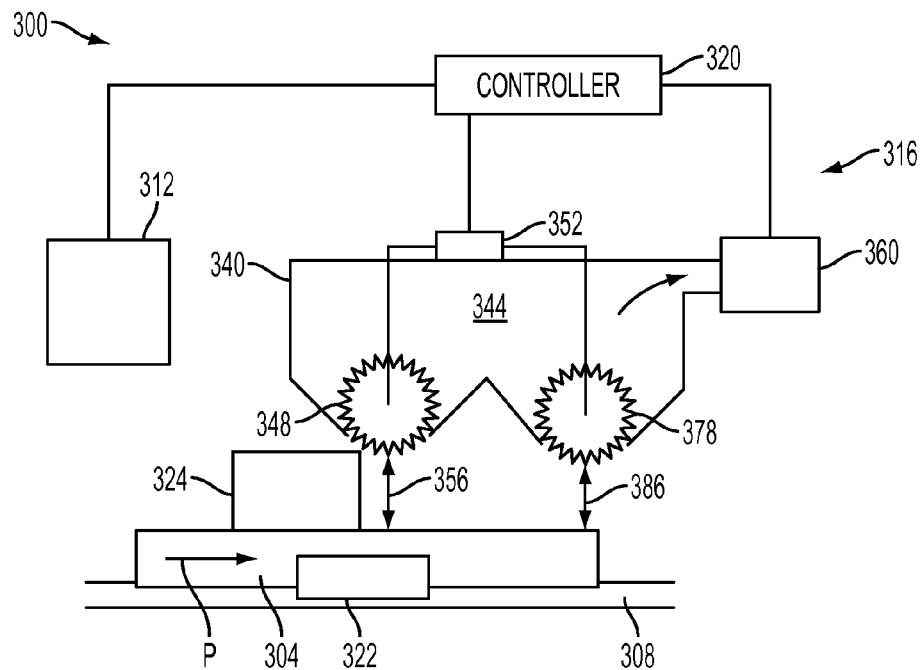
FIG. 3 is a side schematic view of another three-dimensional object printing system.

FIG. 3 is a schematic illustration of another three-dimensional object printing system 300 having only one actuator and only one vacuum source. The printing system 300 includes a platform 304 supported for movement on rails 308, an ejector head 312, a planarizer system 316, and a controller 320. The platform 304 is configured to be moved by a linear motor 322 along the rails 308 in a process direction P from the ejector head 312 to the planarizer system 316. When the platform 304 is positioned opposite the ejector head 312, the ejector head 312 is configured to eject material onto the platform 304 to form an object 324.

The planarizer system 316 includes a housing 340 defining a chamber 344 in which first and second planarizers 348, 378 are positioned. An actuator 352 is operatively connected to the first and second planarizers 348, 378 and is configured to move the planarizers 348, 378 to desired vertical positions so the first planarizer 348 is located at a first vertical distance 356 from the platform 304 and the second planarizer 378 is located at a second vertical distance 386 from the platform 304 that is less than the first distance. In one embodiment, the actuator 352 is configured to move both planarizers 348, 378 concurrently, while in other embodiments a linkage between the actuator 352 and the planarizers 348, 378 enables the actuator 352 to move the planarizers 348, 378 independently of one another. The chamber 344 is fluidly connected to a vacuum source 360 that is configured to produce a vacuum in the chamber 344 to pull material removed by the planarizers 348, 378 from the object 324 in the chamber 344.

Figure 4:
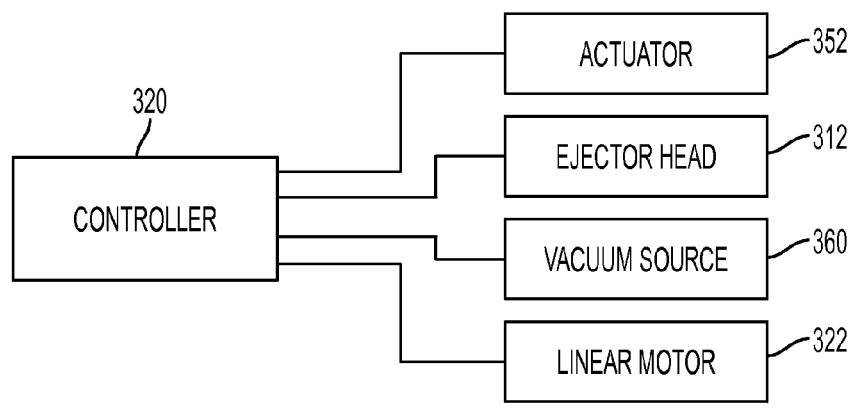
FIG. 4 is a schematic diagram of the controller of the three-dimensional object printing system of FIG. 3.

As is illustrated in FIG. 4, the controller 320 is operatively connected to the actuator 352, the ejector head 312, the vacuum source 360, and the linear motor 322. Operation and control of the various components and functions of the printing system 300 are performed with the aid of the controller 320. The controller 320 is implemented with a general or specialized programmable processor that executes programmed instructions. In some embodiments, the controller includes more than one general or specialized programmable processor. The instructions and data required to perform the programmed functions are stored in a memory unit associated with the controller. The processor, memory, and interface circuitry configure the controller 320 to perform the functions and processes described below. These components can be provided on a printed circuit card or provided as a circuit in an application specific integrated circuit (ASIC). Each of the circuits can be implemented with a separate processor or multiple circuits can be implemented on the same processor. Alternatively, the circuits can be implemented with discrete components or circuits provided in VLSI circuits. Also, the circuits described herein can be implemented with a combination of processors, ASICs, discrete components, or VLSI circuits.

Figure 5:
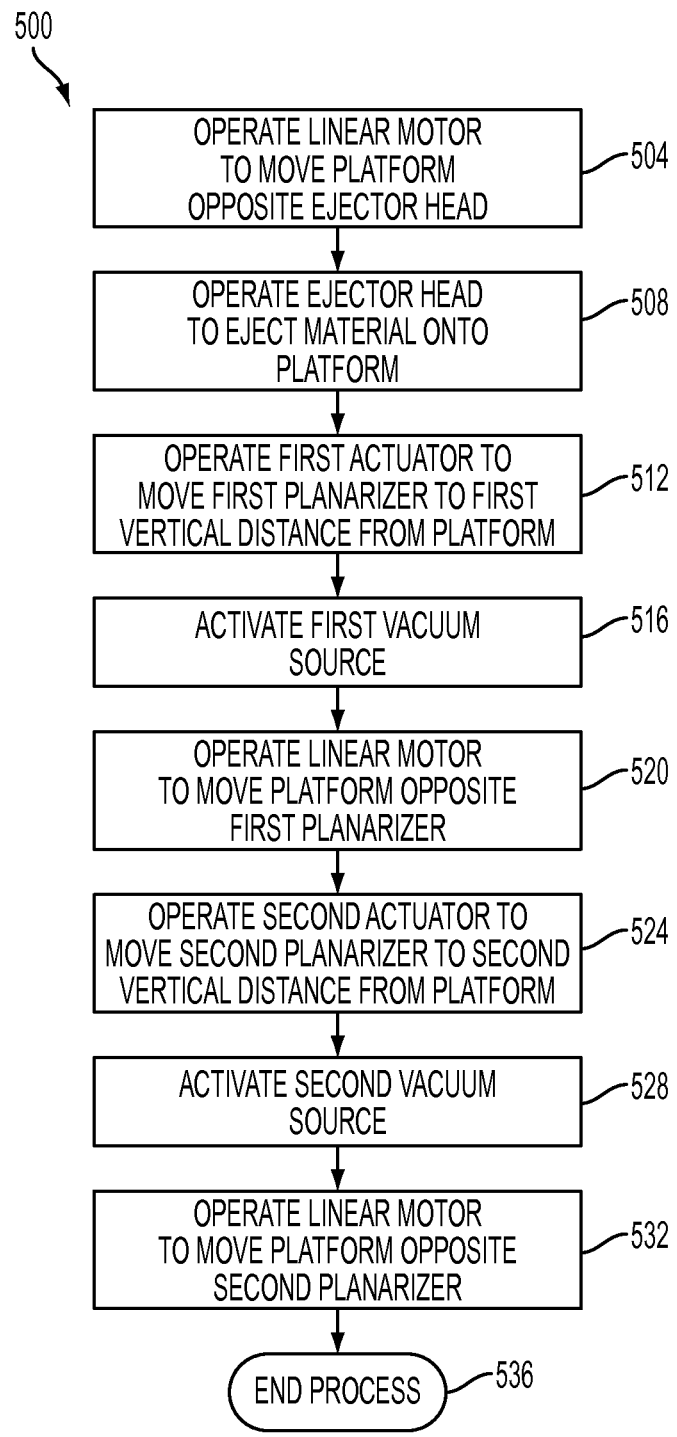
FIG. 5 is a process diagram of a process of printing a three-dimensional object.
Figure 6:
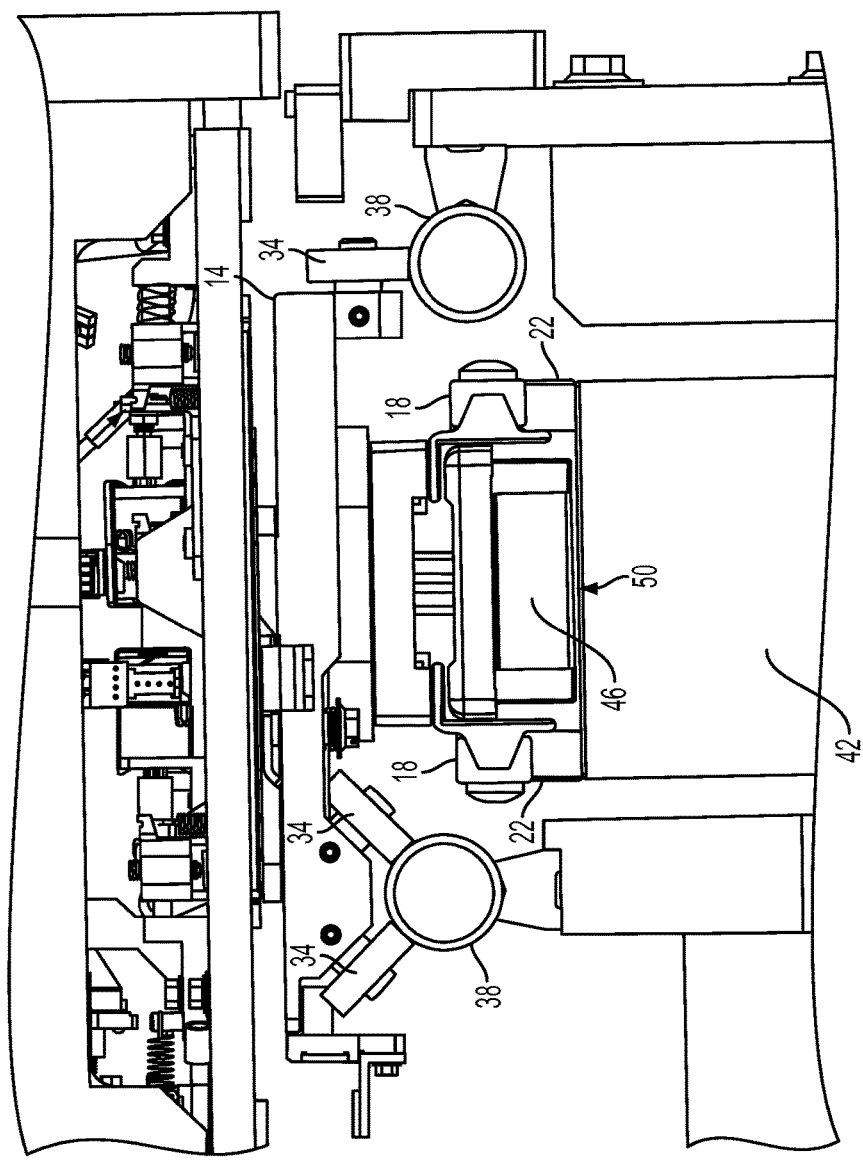
FIG. 6 is a front elevational view of a prior art three-dimensional object printing system.
Figure 7:
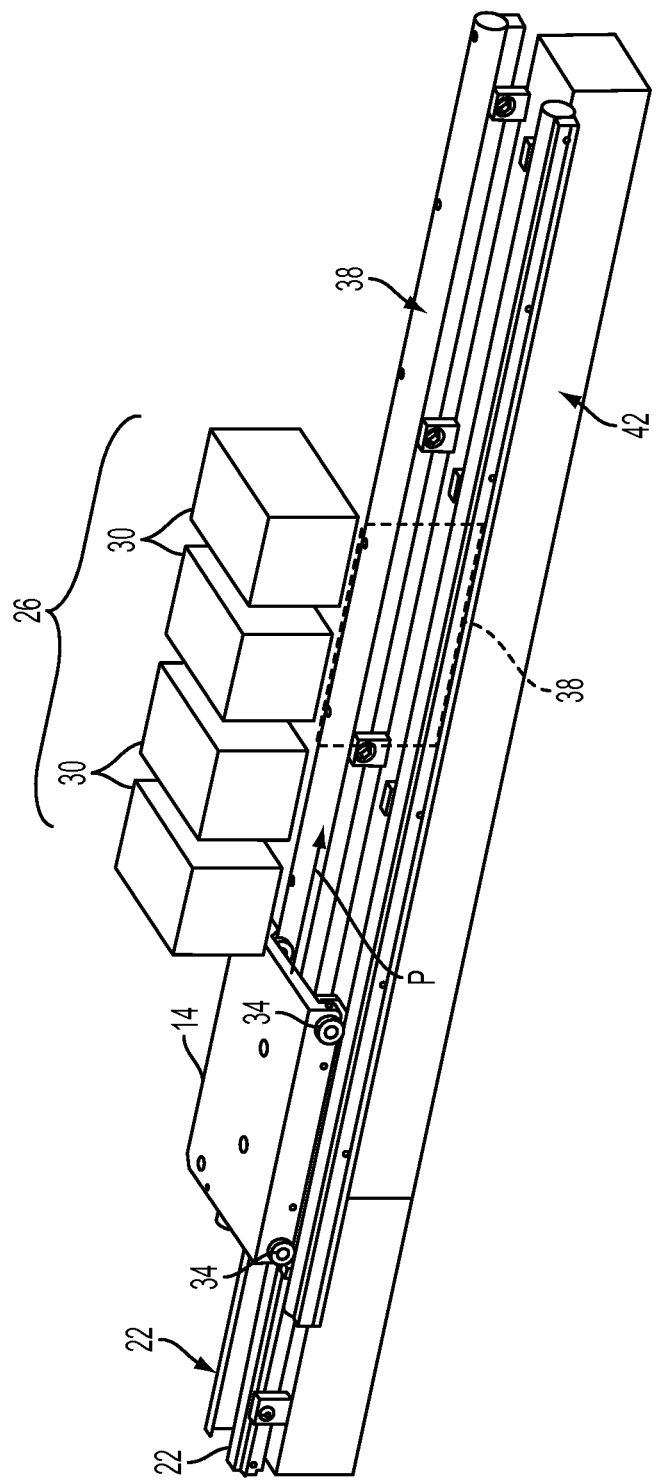
FIG. 7 is a side perspective view of the three-dimensional object printing system of FIG. 6.

FIG. 5 illustrates a method 500 of cleaning ejector heads in a three-dimensional object printing system. For illustrative purposes, the method 500 is described with reference to the printing system 100 described above and shown in FIG. 1 and FIG. 2, though the reader should appreciate that the method 500 can be used with the printing system 300 of FIG. 3 and FIG. 4 or with another similar printing system.

In operation, the controller 120 operates the linear motor 122 to move the platform 104 in the process direction P to a position opposite the ejector head (block 504). The controller 120 then operates the ejector head 112 to eject material onto the platform 104 to produce an object 124 on the platform 104 (block 508). The material ejected to form the object 124 may have an irregular surface at the desired height, and a portion of the material needs to be removed so the upper surface of the object 124 is planar. Based on the quantity of material to be removed from the upper surface of the object 124, the controller 120 determines a first vertical distance 156 at which to position the first planarizer 148 relative to the platform 104, and then operates the first actuator 152 to set the first planarizer 148 at the first vertical distance 156 from the platform 104 (block 512).

The controller 120 activates the first vacuum source 160 to produce a vacuum in the first chamber 144 (block 516). In some embodiments, the controller is configured to determine a strength at which to operate the first vacuum source 160 based upon the first portion of material removed, and the first vacuum source 160 is activated at the determined strength. The controller also operates the linear motor 122 to move the platform 104 opposite the first planarizer 148 to remove a first portion of the material from the object 124 (block 520). The vacuum in the first chamber 144 pulls the material removed by the planarizer 148 form the chamber 144 to prevent the material from falling onto the platform 104 or the rails on which the platform 104 are moved.

Next, the controller 120 determines a second vertical distance 186 at which to position the second planarizer 178 relative to the platform 104 so the second planarizer 178 removes additional material from the object 124 on the platform 104 to form another planar surface on the object. The controller 120 operates the second actuator to move the second planarizer 178 to the second distance 186 from the platform 104 (block 524) and activates the second vacuum source 190 to produce a vacuum in the second chamber 174 (block 528). In some embodiments, the controller is configured to determine a strength at which to operate the second vacuum source 190 based upon the second portion of material removed, and the second vacuum source 190 is operated at the determined strength. The platform 104 is then moved opposite the second planarizer 178 to remove a second portion of material from the object 124 and form a second planar surface on the object (block 532) after which the process is completed (block 536). In some embodiments, the controller is configured to set the position of the planarizers such that the first planarizer removes approximately one-third of the material above a predetermined plane and the second planarizer removes the remaining two-thirds of the material above the predetermined plane.

It will be appreciated that variants of the above-disclosed and other features and functions, or alternatives thereof, may be desirably combined into many other different systems, applications or methods. Various presently unforeseen or unanticipated alternatives, modifications, variations, or improvements therein may be subsequently made by those skilled in the art, which are also intended to be encompassed by the following claims.

What is claimed is:

1. A three-dimensional object printing system comprising:
an ejector head configured to eject drops of material;
a platform configured to move in a process direction to a position opposite the ejector head to enable the ejector head to eject drops of the material toward the platform to form an upper surface of an object on the platform;
a first planarizer positioned in the process direction to be opposite the platform after the ejector head has ejected drops of the material toward the platform, the first planarizer being separated from the platform at a first distance, and the first planarizer being configured to remove a first portion of the material from the upper surface of the object on the platform;
a second planarizer positioned in the process direction to be opposite the platform after the first planarizer has removed the first portion of the material from the upper surface of the object on the platform, the second planarizer being separated from the platform at a second distance that is less than the first distance, and the second planarizer being configured to remove a second portion of the material from the upper surface of the object on the platform, one of the first and the second planarizer being a roller having a knurled surface to remove material from the upper surface of the object on the platform and the other of the first and the second planarizer being a device having a blade to remove material from the upper surface of the object on the platform;
a first housing defining a first chamber in which at least one of the first planarizer and the second planarizer is positioned; and
a first vacuum source connected to the first housing, the first vacuum source being configured to produce a first vacuum in the first chamber to pull material removed by the at least one of the first planarizer and the second planarizer from the first chamber.

2. The printing system of claim 1, wherein the first and second planarizers are both positioned in the first chamber.

3. The printing system of claim 1 further comprising:
the first planarizer being positioned in the first chamber;
a second housing defining a second chamber in which the second planarizer is positioned.

4. The printing system of claim 3, wherein the first vacuum source is operatively connected to the second chamber in the second housing to pull material removed by the second planarizer from the second chamber.

5. The printing system of claim 3 further comprising:
a second vacuum source is operatively connected to the second chamber in the second housing to pull material removed by the second planarizer from the second chamber.

6. The printing system of claim 1 further comprising:
a first actuator operatively connected to the first planarizer, the first actuator being configured to move the first planarizer to the first distance from the platform and to move the second planarizer to the second distance from the platform.

7. The printing system of claim 1 further comprising:
a first actuator operatively connected to the first planarizer, the first actuator being configured to move the first planarizer to the first distance from the platform; and
a second actuator operatively connected to the second planarizer, the second actuator being configured to move the second planarizer to the second distance from the platform.

8. The printing system of claim 7 wherein the first planarizer is positioned in the first chamber and the printing system further comprises:
a second housing defining a second chamber in which the second planarizer is positioned;
a second vacuum source configured to produce a second vacuum in the second chamber to pull material removed by the second planarizer from the second chamber; and
a controller operably connected to the first and second actuators, the first vacuum source, and the second vacuum source, the controller being configured to operate the first actuator to position the first planarizer at the first distance from the platform, to operate the second actuator to position the second planarizer at the second distance from the platform to enable the first portion removed by the first planarizer to be a different amount of material than the second portion removed by the second planarizer, to determine a first vacuum pressure at which to operate the first vacuum source based upon an amount in the first portion of the material to be removed from the upper surface of the object on the platform and to operate the first vacuum at the first vacuum pressure during removal of the first portion of the material from the object on the platform, and to determine a second vacuum pressure at which to operate the second vacuum source based upon an amount of material in the second portion of the material to be removed from the upper surface of the object on the platform and to operate the second vacuum at the second vacuum pressure during removal of the second portion of the material from the object on the platform, the first vacuum pressure being different than the second vacuum pressure.

9. The three-dimensional object printing system of claim 1 wherein the first planarizer is positioned at the first distance from the platform when the first planarizer removes the first portion from the material ejected onto the platform and wherein the second planarizer is positioned at the second distance from the platform when the second planarizer removes the second portion of the material ejected onto the platform.

10. The three-dimensional object printing system of claim 1, the first planarizer further comprising:
a first actuator configured to move the first planarizer horizontally and vertically with respect to the platform to produce a curved surface on the object on the platform.

11. The printing system of claim 10, the second planarizer further comprising: a second actuator configured to move the second planarizer horizontally and vertically with respect to the platform to produce a curved surface on the object on the platform.

* * * * *